United States Patent
Jung et al.

(10) Patent No.: US 11,891,186 B2
(45) Date of Patent: Feb. 6, 2024

(54) AIR MOBILITY VEHICLE WITH A COOLING AIR INTAKE FLAP POSITIONED BELOW A ROTARY WING

(71) Applicants: Hyundai Motor Company, Seoul (KR); Kia Corporation, Seoul (KR)

(72) Inventors: Sang Hyun Jung, Hwaseong-Si (KR); Jae Young Choi, Seongnam-Si (KR); Hee Kwang Lee, Suwon-Si (KR); Chung Sik Yim, Anyang-Si (KR); Kyu Hoon Cho, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 215 days.

(21) Appl. No.: 17/376,674

(22) Filed: Jul. 15, 2021

(65) Prior Publication Data

US 2022/0194618 A1 Jun. 23, 2022

(30) Foreign Application Priority Data

Dec. 22, 2020 (KR) .......................... 10-2020-0181245

(51) Int. Cl.
- *B64D 33/08* (2006.01)
- *B64C 27/26* (2006.01)
- *B64D 27/24* (2006.01)

(52) U.S. Cl.
CPC .............. *B64D 33/08* (2013.01); *B64C 27/26* (2013.01); *B64D 27/24* (2013.01)

(58) Field of Classification Search
CPC .......... B64D 27/24; B64D 33/08; B64C 27/26

(Continued)

(56) References Cited

U.S. PATENT DOCUMENTS

| | | | | |
|---|---|---|---|---|
| 2,206,417 A | * | 7/1940 | Ernest | B64D 33/08 244/55 |
| 2,271,059 A | * | 1/1942 | Boulton | B64D 33/08 123/41.7 |

(Continued)

FOREIGN PATENT DOCUMENTS

| | | |
|---|---|---|
| EP | 3702277 A1 | 9/2020 |
| GB | 1212743 | 11/1970 |

(Continued)

OTHER PUBLICATIONS

European Search Report from European Patent Office in Germany dated Dec. 12, 23, 2021.

*Primary Examiner* — Brady W Frazier
(74) *Attorney, Agent, or Firm* — MORGAN, LEWIS & BOCKIUS LLP (57) ABSTRACT

An air mobility vehicle may include air flaps located under a mounting position of each of rotary wings and rotatably mounted inside openings to guide a flow direction of air flowing to a region under each of the rotary wings or air flowing above the openings to inside of the air mobility vehicle, an actuator coupled to the air flaps and configured to rotate the air flaps to direct the air having passed through the air flaps to a motor, an inverter, or the motor and the inverter of each of the rotary wings, or batteries, and a controller electrically connected to the actuator and configured to control a flow of the air having passed through the air flaps by controlling the actuator depending on a driving state of the air mobility vehicle or temperatures of the motor and the inverter of each of the rotary wings or a temperature of the batteries.

18 Claims, 7 Drawing Sheets

(58) Field of Classification Search
USPC .......................................................... 244/53 B
See application file for complete search history.

(56) References Cited

U.S. PATENT DOCUMENTS

| | | | | |
|---|---|---|---|---|
| 2,543,112 | A * | 2/1951 | Lawrence | ............... B64D 33/08 |
| | | | | 91/367 |
| 2,945,346 | A * | 7/1960 | Arnzen | ..................... F02K 1/60 |
| | | | | 239/265.29 |
| 10,543,906 | B1 * | 1/2020 | Graber | ................... B64C 19/00 |
| 2004/0211862 | A1 * | 10/2004 | Elam | ...................... B64D 27/24 |
| | | | | 244/58 |
| 2015/0232191 | A1 * | 8/2015 | Wetzel | ................ H01M 10/625 |
| | | | | 62/61 |
| 2017/0240291 | A1 | 8/2017 | Kim | |
| 2018/0002023 | A1 * | 1/2018 | Tian | .......................... F01P 5/02 |
| 2019/0047699 | A1 | 2/2019 | Bonden | |
| 2020/0172259 | A1 | 6/2020 | Hinderliter | |
| 2020/0346759 | A1 * | 11/2020 | Coquillat | ............... B64D 33/00 |
| 2021/0155350 | A1 * | 5/2021 | Kwon | .............. H01M 10/6562 |

FOREIGN PATENT DOCUMENTS

| | | |
|---|---|---|
| JP | 2020-037347 A | 3/2020 |
| KR | 10 1863935 | 5/2018 |
| KR | 10 2019 0076508 | 7/2019 |
| WO | WO2018/075413 | 4/2018 |

* cited by examiner

AIR MOBILITY VEHICLE WITH A COOLING AIR INTAKE FLAP POSITIONED BELOW A ROTARY WING

CROSS-REFERENCE TO RELATED APPLICATION

The present application claims priority to Korean Patent Application No. 10-2020-0181245, filed on Dec. 22, 2020, the entire contents of which is incorporated herein for all purposes by this reference.

BACKGROUND OF THE INVENTION

Field of the Invention

The present invention relates to an air mobility vehicle, and more particularly to technology in which flaps rotated to be open are provided under a rotary wing and thus guide external air to the inside of a wing portion of the air mobility vehicle to cool a motor, an inverter, or the motor and the inverter of the rotary wing, or batteries of the air mobility vehicle.

Description of Related Art

Recently, air mobility vehicles, in which rotary wings and fixed wings are mounted such that the aerial mobility vehicles take off or land vertically by operating motors and inverters mounted in the rotary wings using high-voltage batteries, and cruise using the fixed wings after vertical take-off to reduce power consumption of the high-voltage batteries, have been developed.

However, in the conventional air mobility vehicles, the motors and the inverters or the batteries located inside the fixed wings or the fuselages of the air mobility vehicles are operated for a long time and thus generate heat, and thus, a cooling apparatus configured to draw in external air into the fuselage or the fixed wings of an air mobility vehicle to cool the motors and the inverters or the batteries is being developed.

However, technology to cool motors, inverters or batteries of an air mobility vehicle at a point in cooling time depending on the temperature of the motors, inverters or batteries is being required, and the intake apparatus configured to draw in external air in cruising of the air mobility vehicle may lower the flight performance of the air mobility vehicle in cruising.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air mobility vehicle which enables external air to flow to the inside of the air mobility through at least an air flaps, located under a fixed wing and rotatably mounted at at least an opening provided in the air mobility vehicle, to cool a motor, an inverter, or the motor and the inverter of a rotary wing of the air mobility vehicle, or at least a battery of the air mobility vehicle, and allows the at least an air flap to cover the at least an opening when it is not necessary to cool the motor, the inverter, or the motor and the inverter, or the at least a battery to improve the flight performance of the air mobility vehicle.

In accordance with various aspects of the present invention, the above and other objects may be accomplished by the provision of an air mobility vehicle including at least an air flap located under a mounting position of each of rotary wings and rotatably mounted inside at least an opening provided in the air mobility vehicle to guide a flow direction of air flowing to a region under each of the rotary wings or air flowing above the at least an opening to inside of the air mobility vehicle, an actuator coupled to the at least an air flap and configured to rotate the at least an air flap to guide the air having passed through the at least an air flap to a motor, an inverter, or the motor and the inverter of each of the rotary wings, or at least a battery, and a controller electrically connected to the actuator and configured to control a flow of the air having passed through the at least an air flap by controlling the actuator depending on a driving state of the air mobility vehicle or temperatures of the motor and the inverter of each of the rotary wings or a temperature of the at least a battery.

The actuator may include a driving device driven such that a rotation shaft thereof is rotated, and connection link configured to have one end portion rotatably connected to the rotation shaft of the driving device and a remaining end portion connected to the at least an air flap to rotate the at least an air flap according to rotation of the driving device.

The rotary wings may be mounted on booms of the air mobility vehicle such that the motor and the inverter of each of the rotary wings is located inside the boom, the at least a battery may be mounted in a fixed wing of the air mobility vehicle, and the at least an air flap may be mounted on the boom and rotated by operation of the actuator to guide the air flowing to the region under each of the rotary wings to inside of the boom or to inside of the fixed wing via the inside of the boom.

When the at least an air flap is rotated toward the rotary wings in a first direction, the air flowing to the region under each of the rotary wings may pass through the at least an air flap and flow to the inside of the boom to cool the motor and the inverter, and when the at least an air flap is rotated in a second direction opposite to the first direction of the rotary wings, the air flowing into the region in front of the at least an air flap may pass through the at least an air flap and flow to the inside of the fixed wing via the inside of the boom to cool the at least a battery.

The air mobility vehicle may further include an air flow path guiding the air having passed through the at least an air flap to the at least a battery, and outlets discharging the air flowing through the at least an air flap to an outside of the air mobility vehicle after cooling the motor, the inverter, or the motor and the inverter, or the at least a battery.

The at least an air flap in an initial state may cover the at least an opening to prevent the air flowing to the region under each of the rotary wings from flowing to the inside of the air mobility vehicle through the at least an opening.

The air mobility vehicle may further include a first temperature sensor configured to measure temperatures of the motor and the inverter, and a second temperature sensor engaged to the controller and configured to measure a temperature of the at least a battery, and the controller may be configured to control the actuator based on the temperatures measured by the first temperature sensor or the temperature measured by the second temperature sensor.

The controller may be configured to control the actuator such that the air flowing to the region under each of the rotary wings or the air flowing into front of the at least an air flap is guided to the motor and the inverter by the at least an air flap when the temperatures measured by the first temperature sensor are equal to or greater than a first temperature.

The controller may be configured to control the actuator such that the air flowing into the region in front of the at least an air flap is guided to the at least a battery by the at least an air flap when the temperature measured by the second temperature sensor is equal to or greater than a second temperature.

The controller may be configured to control the actuator such that the at least an air flap covers the at least an opening when the temperatures measured by the first temperature sensor and the temperature measured by the second temperature sensor are equal to or lower than a predetermined third temperature.

The controller may be configured to control the actuator such that the air flowing to the region under each of the rotary wings is guided to the motor and the inverter by the at least an air flap when the air mobility vehicle vertically takes off or lands.

The controller may be configured to control the actuator such that the air flowing into the region in front of the at least an air flap is guided to the at least a battery by the at least an air flap when the air mobility vehicle cruises.

The controller may be configured to control the actuator such that the at least an air flap covers the at least an opening when the air mobility vehicle cruises.

The at least an air flap may be provided in plural, and the actuator may be connected to the at least an air flap to rotate the at least an air flap simultaneously.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions in embodiments of the present invention set forth in the description which follows will be exemplarily provided to describe the exemplary embodiments of the present invention. However, the present invention may be embodied in many alternative forms, and may not be construed as being limited to the exemplary embodiments set forth herein.

The exemplary embodiments of the present invention may be variously modified and changed, and thus specific embodiments of the present invention will be illustrated in the drawings and described in detail in the following description of the exemplary embodiments of the present invention. However, it will be understood that the exemplary embodiments of the present invention are provided only to completely disclose the present invention and cover modifications, equivalents or alternatives which come within the scope and technical range of the present invention.

In the following description of the embodiments, terms, such as "first" and "second", are used only to describe various elements, and these elements should not be construed to be limited by these terms. These terms are used only to distinguish one element from other elements. For example, a first element described hereinafter may be termed a second element, and similarly, a second element described hereinafter may be termed a first element, without departing from the scope of the present invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those in the skill in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will be made in detail to various embodiments of the present invention, examples of which are illustrated in the accompanying drawings and described below. In the drawings, the same or similar elements are denoted by the same reference numerals even when they are depicted in different drawings.

A controller 10 according to various exemplary embodiments of the present invention may be implemented through a non-volatile memory, configured to store data regarding an algorithm configured to control operations of various elements of a vehicle or software commands for reproducing the algorithm, and a processor configured to perform operations which will be described below using the data stored in the corresponding memory. Here, the memory and the processor may be implemented as individual chips. Alternatively, the memory and the processor may be implemented as a single integrated chip. Here, the processor may take the form of at least one processor.

Figure 1:
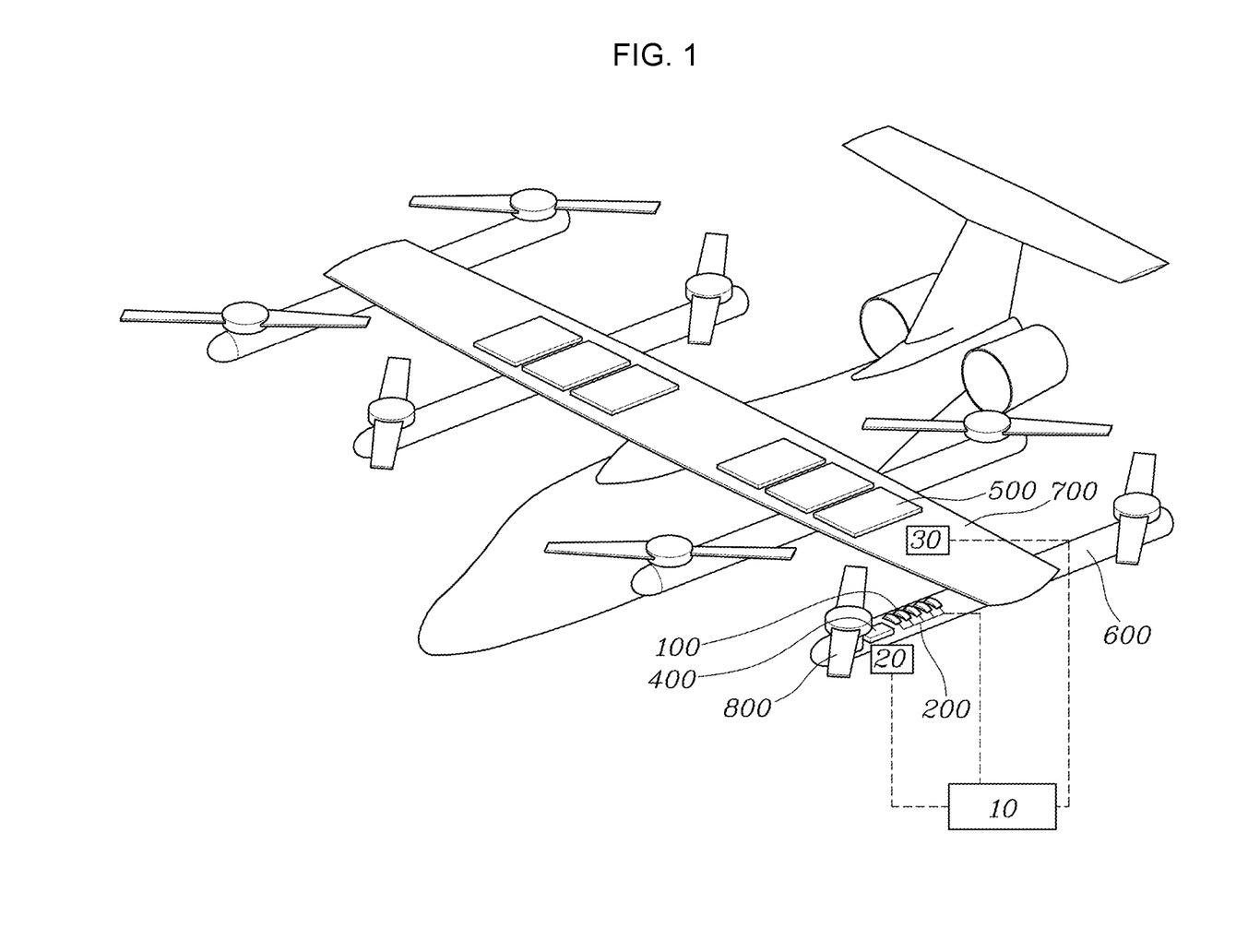
FIG. 1 is a perspective view of an air mobility vehicle according to various exemplary embodiments of the present invention.
Figure 2:
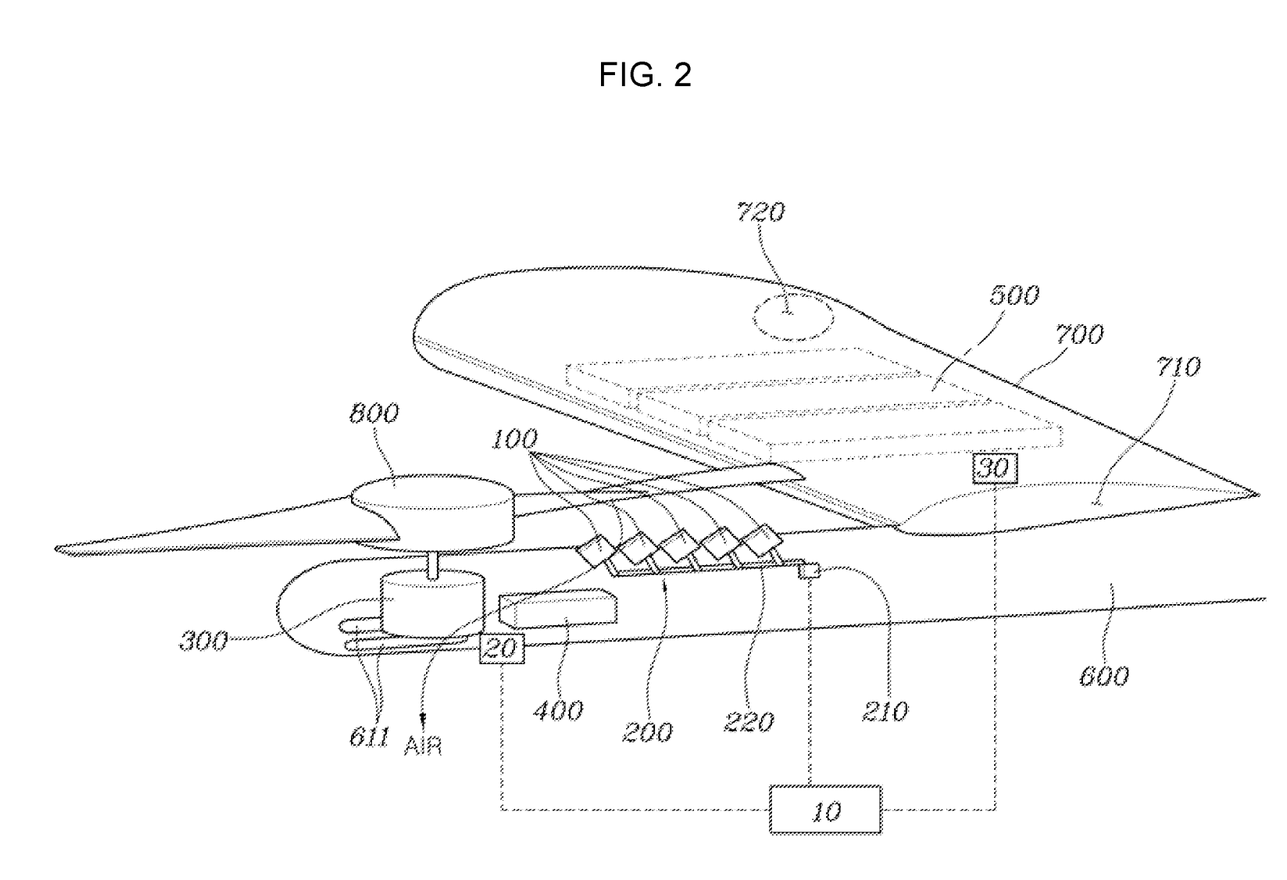
FIG. 2 is a perspective view exemplarily illustrating guiding of air to a motor and an inverter by air flaps of the air mobility vehicle according to various exemplary embodiments of the present invention to cool the motor and the inverter.
Figure 3:
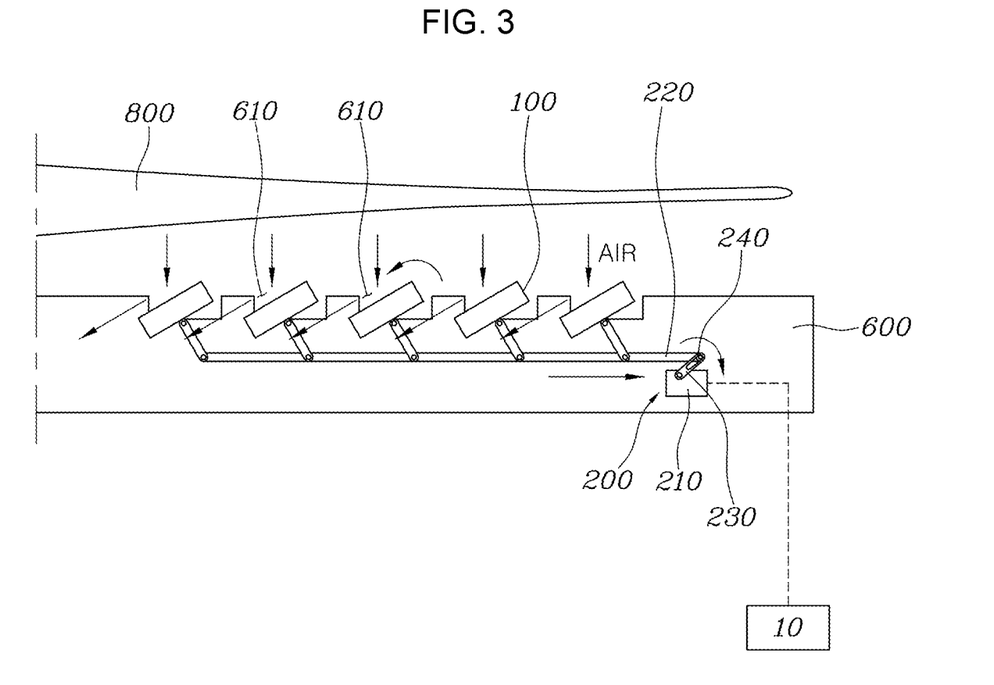
FIG. 3 is a cross-sectional view of FIG. 2.
Figure 4:
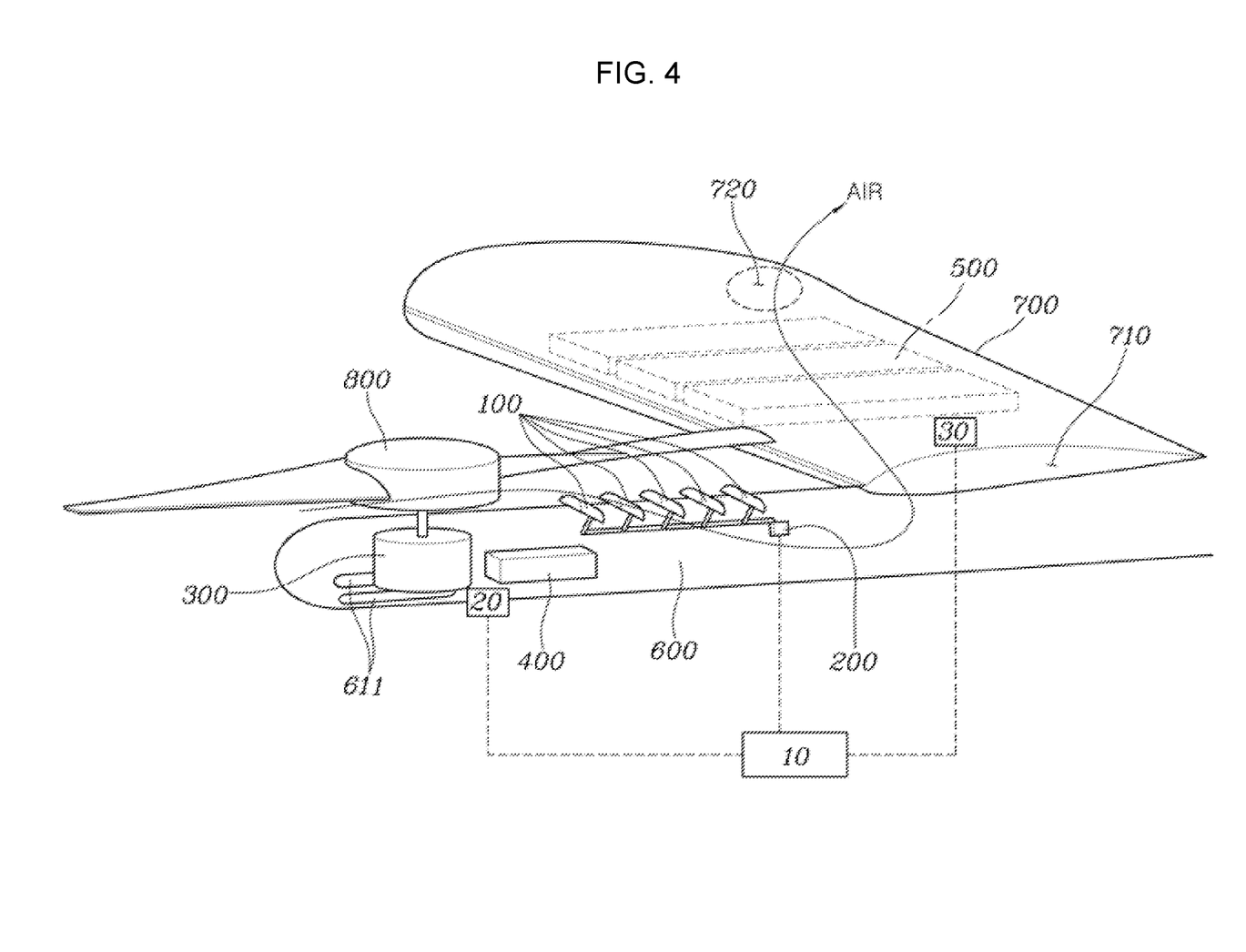
FIG. 4 is a perspective view exemplarily illustrating guiding of air to batteries by the air flaps of the air mobility vehicle according to various exemplary embodiments of the present invention to cool the batteries.
Figure 5:
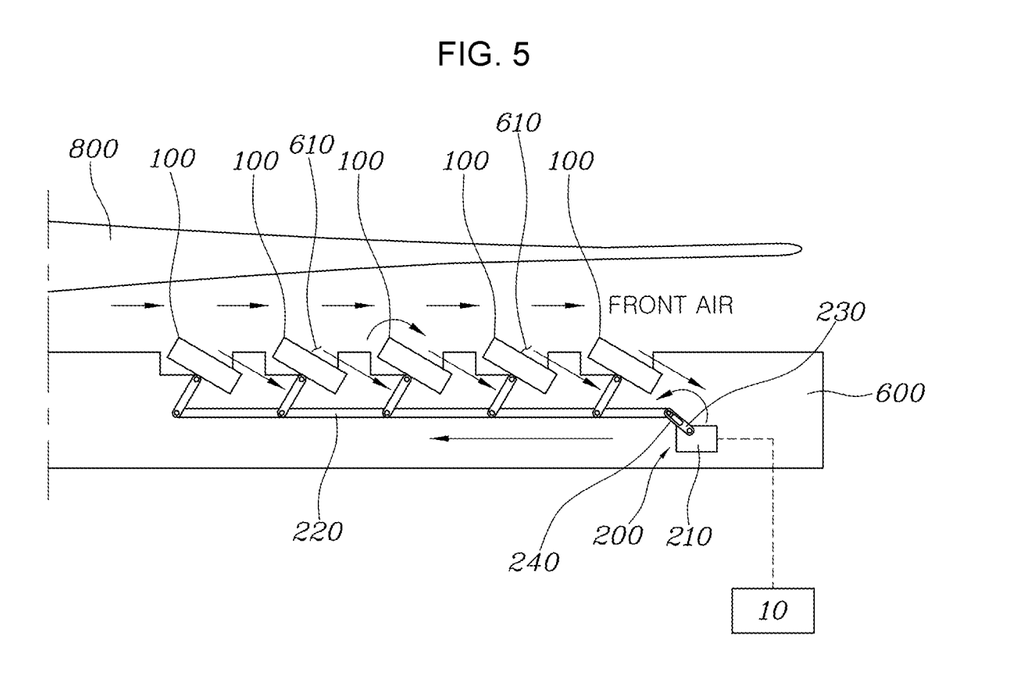
FIG. 5 is a cross-sectional view of FIG. 4.

FIG. 1 is a perspective view of an air mobility vehicle according to various exemplary embodiments of the present invention, FIG. 2 is a perspective view exemplarily illustrating guiding of air to a motor 300 and an inverter 400 by air flaps 100 of the air mobility vehicle according to various exemplary embodiments of the present invention to cool the motor 300 and the inverter 400, FIG. 3 is a cross-sectional view of FIG. 2, FIG. 4 is a perspective view exemplarily illustrating guiding of air to batteries 500 by the air flaps 100 of the air mobility vehicle according to various exemplary embodiments of the present invention to cool the batteries 100, and FIG. 5 is a cross-sectional view of FIG. 4.

Referring to FIG. 1, FIG. 2, FIG. 3, FIG. 4, and FIG. 5, the air mobility vehicle according to various exemplary embodiments of the present invention will be described.

The air mobility vehicle according to various exemplary embodiments of the present invention, in which rotary wings 800 and a fixed wing 700 are provided, may take off and land vertically, and may cruise using the fixed wing 700 after vertical take-off.

The air mobility vehicle according to various exemplary embodiments of the present invention may be operated by batteries 500, or may be operated by an internal combustion engine other than the batteries 500.

The air mobility vehicle according to various exemplary embodiments of the present invention includes air flaps 100 located under a mounting position of each of the rotary wings 800 and rotatably mounted inside openings 610 provided in the air mobility vehicle to guide the flow direction of air flowing to a region under the rotary wing 800 or air flowing above the openings 610 to the inside of the air mobility vehicle, an actuator 200 configured to rotate the air flaps 100 to guide the air having passed through the air flaps 100 to the motor 300, the inverter 400, or the motor 300 and the inverter 400 of the rotary wing 800, or the batteries 500, and a controller 10 configured to control the flow of the air having passed through the air flaps 100 by controlling the actuator 200 depending on the driving state of the air mobility vehicle or the temperatures of the motor 300 the inverter 400 of the rotary wing 800 or the temperature of the batteries 500.

As shown in FIG. 1, FIG. 2, FIG. 3, FIG. 4, and FIG. 5, the rotary wings 800, each of which has a rotation shaft vertically provided, may be mounted on the air mobility vehicle, the openings 610 may be formed under each of the rotary wings 800, and the air flaps 100 operated to open or close the openings 610 may be provided.

The air flaps 100 may guide external air to the inside of the air mobility vehicle when the air flaps 100 open the openings 610, and guide external air to the motor 300 and the inverter 400 of the rotary wing 800 or to the batteries 500 depending on the opened directions of the openings 610, being configured for cooling the heated motor 300 and inverter 400 or the heated batteries 500 through external air.

The actuator 200 is connected to the air flaps 100 to rotate the air flaps 100, and may be operated such that the air flaps 100 open the openings 610 only as needed.

The controller 10 is connected to the actuator 200 to control operation of the actuator 200, and may control the actuator 200 such that the air flaps 100 open or close the openings 610 based on the driving state of the air mobility vehicle or differences between the temperature of external air and the temperatures of the motor 300 and inverter 400 or a difference between the temperature of external air and the temperature of the batteries 500.

The air flaps 100 are controlled to open the openings 610 to allow external air to flow into the air mobility vehicle through operation of the air flaps 100 to cool the motor 300, the inverter 400, or the motor 300 and the inverter 400 of the rotary wing 800, or the batteries 500 of the air mobility vehicle, and if cooling is not needed, the air flaps 100 are controlled to close the openings 610, facilitating the air mobility vehicle to effectively fly.

The actuator 200 may include a driving device 210 driven such that the rotation shaft thereof is rotated, and connection link 220 configured to have one end portion rotatably connected to the rotation shaft 230 of the driving device 210 and the other end portion connected to the air flaps 100 to rotate the air flaps 100 based on the rotation of the driving device 210.

As shown in FIG. 2, the actuator 200 may include the driving device 210 driven such that the rotation shaft thereof is rotated, and the connection link 220 configured to connect the rotation shaft to the air flaps 100 to rotate the air flaps 100 based on the rotation of the rotation shaft.

The connection link 220 transmits the rotational force of the rotation shaft to the air flaps 100.

In an exemplary embodiment of the present invention, the rotation shaft 230 includes a slot 240 into which end portions of the connection link 220 is slidably coupled to the slot 240 in the rotation shaft 230 of the driving device 210.

Accordingly, when the controller 10 controls the driving device 210, the driving device 210 may rotate the air flaps 100 forwards or rearwards thereof.

Furthermore, in addition to the structure of the actuator 200 including the driving device 210 and the connection link 220, as shown in the drawings, the actuator 200 may be formed to have the structure of a linear device, or may be formed to have various structures.

The rotary wings 800 are mounted on booms 600 of the air mobility vehicle such that the motor 300 and the inverter 400 of each of the rotary wings 800 is located inside the boom 600, the batteries 500 are mounted in the fixed wing 700 of the air mobility vehicle, and the air flaps 100 are mounted on the boom 600 and rotated by the operation of the actuator 20 to guide air flowing to a region under the rotary wing 800 or air flowing into front of the air flaps 100 to the inside of the boom 600 or to the inside of the fixed wing 700 via the inside of the boom 600.

The air mobility vehicle may include the fixed wing 700 extending from the fuselage thereof and the booms 600 extending from the fixed wing 700, the batteries 500 may be mounted in the fixed wing 700, and the rotary wings 800 may be mounted on the upper surface of the booms 600.

The rotary wings 800 may be used in vertical take-off and landing of the air mobility vehicle, and the fixed wing 700 may be used in cruising of the air mobility vehicle.

Therefore, the motor 300 and the inverter 400 of the rotary wing 800 may be located inside the boom 600, and the air flaps 100, which are located on the boom 600 under the rotary wing 800, may guide external air to the inside of the boom 600 to cool the motor 300 and the inverter 400 of the rotary wing 800 or guide external air to the inside of the fixed wing 700 via the inside of the boom 600 to cool the batteries 500 when the air flaps 100 open the openings 610. Meanwhile, a reference numeral 620 as shown in each of FIGS. 2 and 4 denotes outlets provided in the boom 600 to fluidically communicate with the openings 610.

When the air flaps 100 are rotated toward the rotary wing 800, air flowing to a region under the rotary wing 800 may pass through the air flaps 100 and flow to the inside of the boom 600 to cool the motor 300 and the inverter 400, and when the air flaps 100 are rotated in a direction opposite to the rotary wing 800, air flowing into front of the air flaps 100 may pass through the air flaps 100 and flow to the inside of the fixed wing 700 via the inside of the boom 600 to cool the batteries 500.

As shown in FIG. 2 and FIG. 3, when the motor 300 and the inverter of the rotary wing 800 are cooled, the air flaps 100 may be rotated toward the rotary wing 800 and guide the flow of external air to guide air, which flows to the region under the rotary wing 800 by the rotation of the rotary wing 800, to the inside of the boom 600.

Furthermore, as shown in FIG. 4 and FIG. 5, when the batteries 500 are cooled, the air flaps 100 may be rotated in the direction opposite to the rotary wing 800 and guide air, which flows in front of the air flaps 100, to the inside of the fixed wing 700 via the inside of the boom 600 to cool the batteries 500 located inside the fixed wing 700.

The air mobility vehicle may further include an air flow path 710 configured to guide the air having passed through the air flaps 100 to the batteries 500, and the outlets 620 and 720 configured to discharge the air flowing to the inside of the air mobility vehicle through the air flaps 100 to the outside after cooling the motor 300, the inverter 400, or the motor 300 and the inverter 400, or the batteries 500.

When the air flaps 100 cool the batteries 500, external air may flow to the inside of the boom 600 and the inside of the fixed wing 700, and the air flow path 710 configured to guide the flow of external air to allow air flowing to the inside of the boom 600 to flow to the inside of the fixed wing 700 may be formed inside of the boom 600.

Furthermore, the outlets 620 and 720 configured to discharge the air flowing to the inside of the air mobility vehicle through the air flaps 100 to the outside after cooling the motor 300, the inverter 400, or the motor 300 and the inverter 400, or the batteries 500 may be formed, preventing the fuselage of the air mobility vehicle from shaking due to inflow of external air into the fuselage of the air mobility vehicle.

Figure 6:
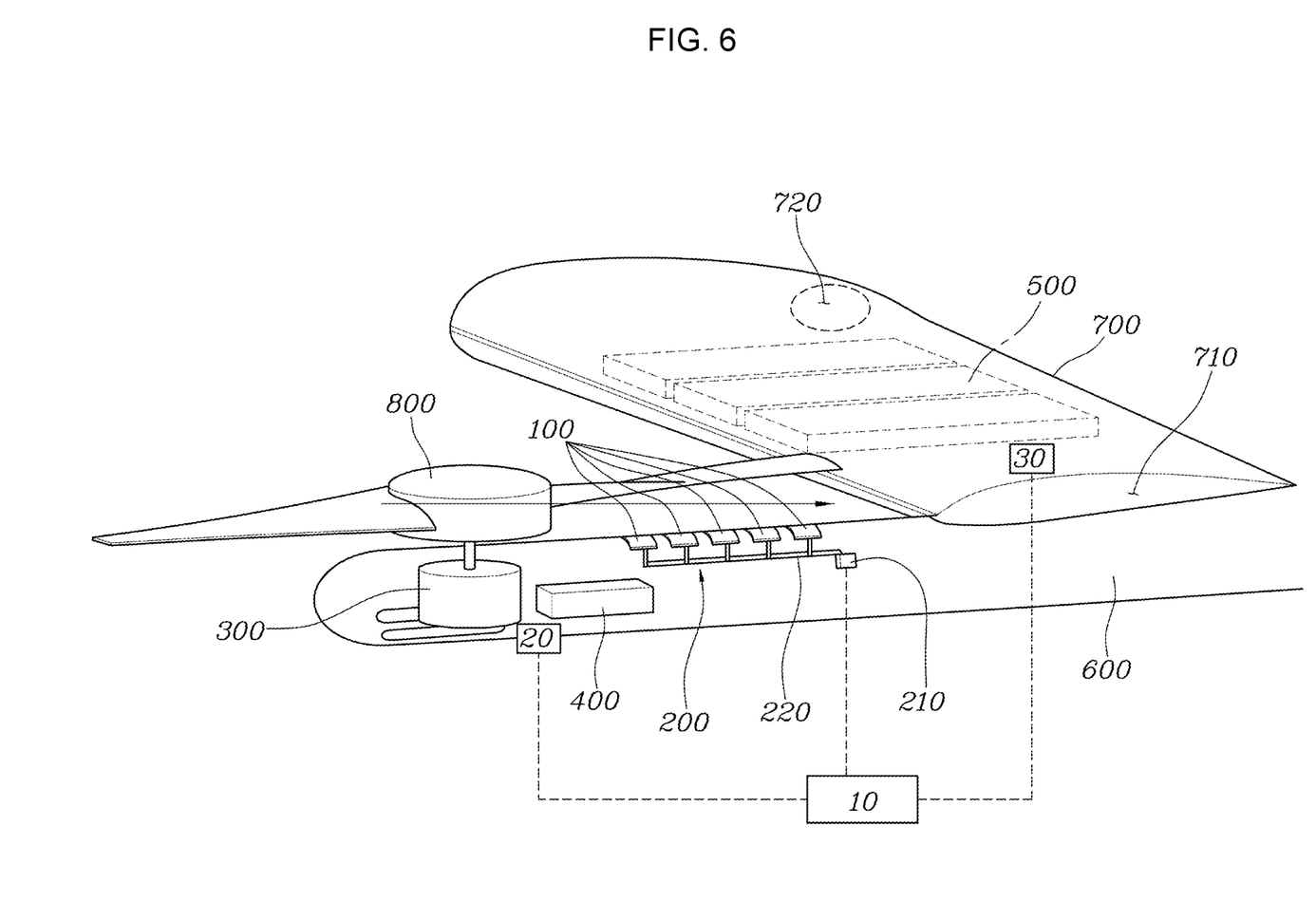
FIG. 6 is a perspective view exemplarily illustrating the state in which the air flaps of the air mobility vehicle according to various exemplary embodiments of the present invention close openings.
Figure 7:
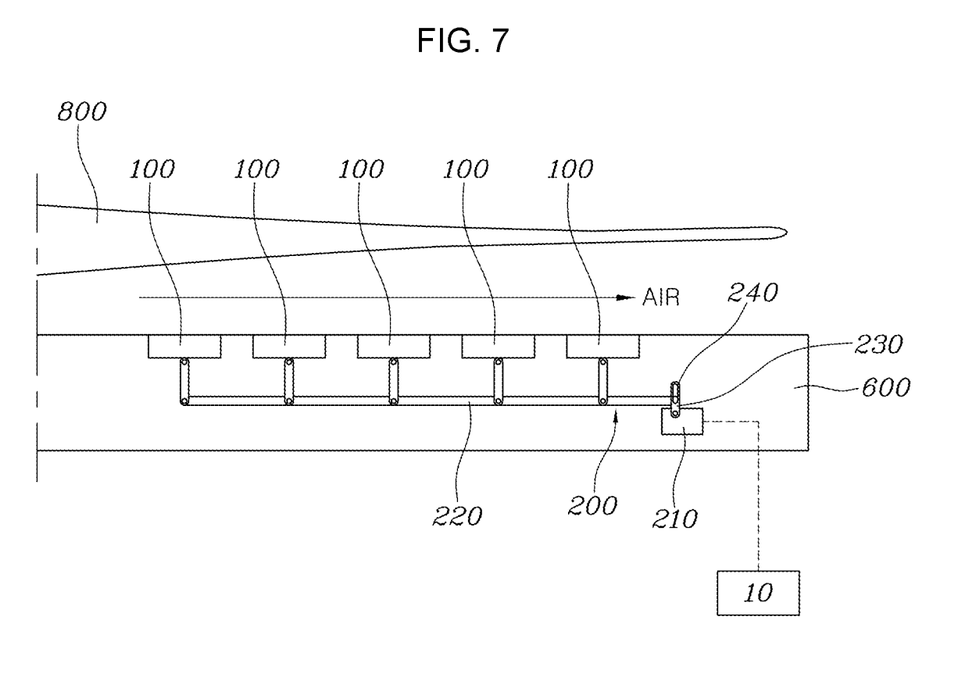
FIG. 7 is a cross-sectional view of FIG. 6.

FIG. 6 is a perspective view exemplarily illustrating the state in which the air flaps 100 of the air mobility vehicle according to various exemplary embodiments of the present invention close the openings 610, and FIG. 7 is a cross-sectional view of FIG. 6.

As shown in FIG. 6 and FIG. 7, the air flaps 100 in the initial state may cover the openings 610 to prevent air flowing to the region under the rotary wing 800 from flowing to the inside of the air mobility vehicle.

When the motor 300, the invertor 400, or the motor 300 and the inverter 400, or the batteries 500 do not need to be cooled, the air flaps 100 maintains the initial state thereof to cover the openings 610, and thus external air does not flow to the inside of the air mobility vehicle.

Accordingly, the air mobility vehicle may effectively fly without inflow of external air to the inside of the air mobility vehicle when flying.

The air mobility vehicle may further include a first temperature sensor 20 configured to measure the temperatures of the motor 300 and the inverter 400, and a second temperature sensor 30 configured to measure the temperature of the batteries 500, and the controller 10 may control the actuator 200 based on the temperature(s) measured by the first temperature sensor 20 or the second temperature sensor 30.

The first temperature sensor 20 may measure the temperatures of the motor 300 and the inverter 400 of the rotary wing 800, the second temperature sensor 30 may measure the temperature of the batteries 500, and the controller 10 may rotate the air flaps 100 based on the temperatures of the motor 300 and the inverter 400 or the temperature of the batteries 500.

Accordingly, the air flaps 100 may be effectively rotated by comparing the temperatures of the motor 300 and the inverter 400 or the temperature of the batteries 500 to a corresponding reference temperature.

The controller 10 may control the actuator 200 such that air flowing to the region under the rotary wing 800 is guided to the motor 300 and the inverter 400 by the air flaps 100 when the temperatures measured by the first temperature sensor 20 are equal to or greater than a first temperature.

When the temperatures measured by the first temperature sensor 20 are equal to or greater than the first temperature, the controller 10 may determine that it is necessary to cool the motor 300 and the inverter 400, and may control the actuator 200 to rotate the air flaps 100 toward the rotary wing 800.

Accordingly, external air may flow toward the motor 300 and the inverter 400 to cool the motor 300 and the inverter 400.

Therefore, increases in the temperatures of the motor 300 and the inverter 400 may be detected, and the air flaps 100 may be controlled in a response to the temperature increases.

The controller 10 may control the actuator 200 such that air flowing into the region in front of the air flaps 100 is guided to the batteries 500 by the air flaps 100 when the temperature measured by the second temperature sensor 30 is equal to or greater than a second temperature.

When the temperature measured by the second temperature sensor 30 is equal to or greater than the second temperature, the controller 10 may determine that it is necessary to cool the batteries 500, and may control the actuator 200 to rotate the air flaps 100 in the direction opposite to the rotary wing 800.

Accordingly, external air may flow toward the batteries 500 to cool the batteries 500.

Because a temperature required for cooling the motor 300 and the inverter 400 and a temperature required for cooling the batteries 500 may be set to different temperatures, the first temperature and the second temperature may be set to different temperatures.

Furthermore, the controller 10 may control the operation of the actuator 200 by comparing a first difference value between the temperature measured by the first temperature sensor 20 and the first temperature in the state in which the temperature measured by the first temperature sensor 20 is equal to or greater than the first temperature and a second difference value between the temperature measured by the second temperature sensor 30 and the second temperature in the state in which the temperature measured by the second temperature sensor 30 is equal to or greater than the second temperature.

Therefore, the air flaps 100 may be organically controlled by detecting temperature differences between the temperature of external air and the temperatures of the motor 300 and the inverter 400 or a temperature difference between the temperature of external air and the temperature of the batteries 500.

The controller 10 may control the actuator 200 such that the air flaps 100 cover the openings 610 when the temperatures measured by the first temperature sensor 20 and the temperature measured by the second temperature sensor 30 are equal to or lower than a predetermined third temperature.

When the temperatures of the motor 300 and the inverter 400 measured by the first temperature sensor 20 and the temperature measured by the second temperature sensor 30 are equal to lower than the predetermined third temperature, it is not necessary to cool the motor 300, the inverter 400, or the motor 300 and the inverter 400, or the batteries 500.

The predetermined third temperature may be set to a temperature lower than the first temperature and the second temperature.

Accordingly, the controller 10 may control the actuator 200 such that the air flaps 100 cover the openings 610 without being rotated.

Therefore, external air flows along the external surfaces of the booms 600 when the air mobility vehicle flies, and thus, the energy efficiency of the air mobility vehicle may be improved.

The controller 10 may control the actuator 200 such that air flowing to the region under the rotary wing 800 is guided to the motor 300 and the inverter 400 by the air flaps 100 when the air mobility vehicle vertically takes off or lands.

When the air mobility vehicle vertically takes off or lands, the RPM of the rotary wings 800 is increased and thus it is necessary to cool the motor 300 and the inverter 400 of each of the rotary wings 800.

In the instant case, the air flaps 100 may be rotated toward the rotary wing 800, and thus guide the flow of external air so that air flowing to the region under the rotary wing 800 when the rotary wing 800 is rotated flows to the inside of the air mobility vehicle.

The external air flowing to the inside of the boom 600 of the air mobility vehicle through the air flaps 100 may cool the motor 300 and the inverter 400 of the rotary wing 800 and then be discharged to the outside through the outlets 620.

Accordingly, the air mobility vehicle may effectively vertically take off and land.

The controller 10 may control the actuator 200 such that air flowing in the region in front of the air flaps 100 is guided to the batteries 500 by the air flaps 100 when the air mobility vehicle cruises.

When the air mobility vehicle cruises, the RPM of the rotary wings 800 is decreased or the rotation of the rotary wings 800 is stopped and thus it is not necessary to cool the motor 300 and the inverter 400 of each of the rotary wings 800, whereas it is necessary to cool the batteries 500.

In the instant case, the air flaps 100 may be rotated in the opposite direction to the rotary wing 800, and thus guide the flow of external air so that air flowing into the region in front of the air flaps 100 flows to the inside of the air mobility vehicle and is guided to the fixed wing 700 through the air flow path 710 to cool the batteries 500, and then the external air may be discharged to the outside through the outlet 720 after cooling the batteries 500.

The controller 10 may control the actuator 200 such that the air flaps 100 cover the openings 610 when the air mobility vehicle cruises.

When the batteries 500 are sufficiently cooled and it is not necessary to cool the batteries 500 during cruising of the air mobility vehicle, the controller 10 may control the actuator 200 such that the air flaps 100 cover the openings 610 to maximize the aerodynamic performance of the air mobility vehicle.

Accordingly, the air mobility vehicle may effectively fly.

The air flaps 100 may be provided in plural, and the actuator 200 may be connected to the plural air flaps 100 to rotate the air flaps 100 simultaneously.

As shown in FIGS. 1 to 7, the air flaps 100 may be provided in plural, and may be applied to air mobility vehicles having various sizes.

Furthermore, the plural air flaps 100 may be integrally connected to the actuator 200 to be simultaneously rotated.

As is apparent from the above description, an air mobility vehicle according to various exemplary embodiments of the present invention rotates air flaps to cool a motor and an inverter of a rotary wing or to cool batteries depending on the flight state of the air mobility vehicle, and controls the air flaps to cover openings during cruising, being configured for effectively flying.

Furthermore, the air mobility vehicle according to various exemplary embodiments of the present invention rotates the air flaps based on a result of comparison of the temperatures of the motor and the inverter or the temperature of the batteries to the temperature of external air, being configured for effectively operating the air flaps.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air mobility vehicle with a cooling air system, the air mobility vehicle comprising:
    rotary wings mounted on an outside of the air mobility vehicle;
    a motor disposed at an inside of the air mobility vehicle;
    an inverter disposed at the inside of the air mobility vehicle;
    at least a battery disposed at the inside of the air mobility vehicle;
    at least an air flap located under a mounting position of each of the rotary wings and rotatably mounted inside at least an opening provided in the air mobility vehicle to guide a flow direction of air flowing to a region under each of the rotary wings to the inside of the air mobility vehicle;
    an actuator coupled to the at least an air flap and configured to rotate the at least an air flap to selectively guide the air having passed through the at least an air flap to the motor and the inverter, or to the at least a battery; and
    a controller electrically connected to the actuator and configured to control a flow of the air having passed through the at least an air flap by controlling the actuator according to a driving state of the air mobility vehicle or temperatures of the motor, the inverter, and the at least a battery.

2. The air mobility vehicle according to claim 1, wherein the actuator includes:
    a driving device having a rotation shaft; and
    a connection link having a first end portion rotatably connected to the rotation shaft of the driving device and a second end portion connected to the at least an air flap to rotate the at least an air flap according to rotation of the driving device.

3. The air mobility vehicle according to claim 2, wherein the rotation shaft of the driving device includes a slot into which the first end portion of the connection link is slidably coupled.

4. The air mobility vehicle according to claim 1,
    wherein the rotary wings are mounted on booms of the air mobility vehicle so that the motor and the inverter of each of the rotary wings is located inside a corresponding boom, and the at least a battery is mounted in a fixed wing of the air mobility vehicle; and
    wherein the at least an air flap is mounted on the booms and rotated by operation of the actuator to guide the air flowing to the region under each of the rotary wings to an inside of the boom or to an inside of the fixed wing via the inside of the boom.

5. The air mobility vehicle according to claim 4, wherein, when the at least an air flap is rotated toward the rotary wings in a first direction, the air flowing to the region under each of the rotary wings passes through the at least an air flap and flows to the inside of the booms to cool the motor and the inverter.

6. The air mobility vehicle according to claim 4, wherein when the at least an air flap is rotated in a second direction opposite to the first direction of the rotary wings, the air flowing in the region in a front of the at least an air flap passes through the at least an air flap and flows to the inside of the fixed wing via the inside of the booms to cool the at least a battery.

7. The air mobility vehicle according to claim 1, further including:
    an air flow path guiding the air having passed through the at least an air flap to the at least a battery; and
    outlets discharging the air flowing through the at least an air flap to an outside of the air mobility vehicle after cooling the motor, the inverter, or the motor and the inverter, or the at least a battery.

8. The air mobility vehicle according to claim 7,
    wherein the at least a battery is mounted in a fixed wing of the air mobility vehicle, and wherein one of the outlets is formed on a surface of the fixed wing, and wherein the one of the outlets is connected to the air flow path.

9. The air mobility vehicle according to claim 1, wherein the at least an air flap in an initial state covers the at least an opening to prevent the air flowing to the region under each of the rotary wings from flowing to the inside of the air mobility vehicle through the at least an opening.

10. The air mobility vehicle according to claim 1, further including:

a first temperature sensor engaged to the controller and configured to measure temperatures of the motor and the inverter; and a second temperature sensor engaged to the controller and configured to measure a temperature of the at least a battery, wherein the controller is configured to control the actuator according to the temperatures measured by the first temperature sensor or the temperature measured by the second temperature sensor.

11. The air mobility vehicle according to claim 10, wherein the controller is configured to control the actuator so that the air flowing to the region under each of the rotary wings or an air flowing in a front of the at least an air flap is guided to the motor and the inverter by the at least an air flap when the temperatures measured by the first temperature sensor are equal to or higher than a first temperature.

12. The air mobility vehicle according to claim 10, wherein the controller is configured to control the actuator so that the air flowing in the region in a front of the at least an air flap is guided to the at least a battery by the at least an air flap when the temperature measured by the second temperature sensor is equal to or greater than a second temperature.

13. The air mobility vehicle according to claim 10, wherein the controller is configured to control the actuator so that the at least an air flap covers the at least an opening when the temperatures measured by the first temperature sensor and the temperature measured by the second temperature sensor are equal to or lower than a predetermined third temperature.

14. The air mobility vehicle according to claim 1, wherein the controller is configured to control the actuator so that the air flowing to the region under each of the rotary wings is guided to the motor and the inverter by the at least an air flap when the air mobility vehicle vertically takes off or lands.

15. The air mobility vehicle according to claim 1, wherein the controller is configured to control the actuator so that the air flowing in the region in a front of the at least an air flap is guided to the at least a battery by the at least an air flap when the air mobility vehicle cruises.

16. The air mobility vehicle according to claim 1, wherein the controller is configured to control the actuator so that the at least an air flap covers the at least an opening when the air mobility vehicle cruises.

17. The air mobility vehicle according to claim 1, wherein the at least an air flap is provided in plural, and the actuator is connected to the at least an air flap to rotate the at least an air flap simultaneously.

18. The air mobility vehicle according to claim 1, wherein the rotary wings are mounted on booms of the air mobility vehicle, and wherein the booms include an air discharge vent to fluidically communicate with the at least an opening.

* * * * *